Aug. 20, 1957  E. B. FERNBERG  2,803,048

FASTENER

Filed Nov. 9, 1953

Inventor
Eric B. Fernberg
by Malcolm W. Fraser
attorney

United States Patent Office 2,803,048
Patented Aug. 20, 1957

2,803,048

FASTENER

Eric Birger Fernberg, Northwood, England, assignor to F. T. Products Limited, London, England, a British company Application November 9, 1953, Serial No. 390,959

6 Claims. (Cl. 24—73)

The present invention relates to an improved fastener particularly, although not exclusively, useful for securing a trim pad to the inside of a steel-panel door of an automobile.

It is common practice at the present time to use a large number of snap-fasteners to hold trim pads to the panel body of an automobile, one portion of each fastener being engaged in a hole in the pad and another portion being snapped into engagement with a hole in the metal panel body.

It is one object of this invention to provide fasteners suitable for this purpose, which are cheap to make, since many are used in one automobile.

Another object is to enable each fastener to be made by simple bending and shearing operations, and in particular to avoid having to bend the metal of each fastener about lines which are not parallel, since such a process increases the cost of production.

Preferred forms of the invention will now be described with reference to the accompanying diagrammatic drawings, in which.

Figure 1:
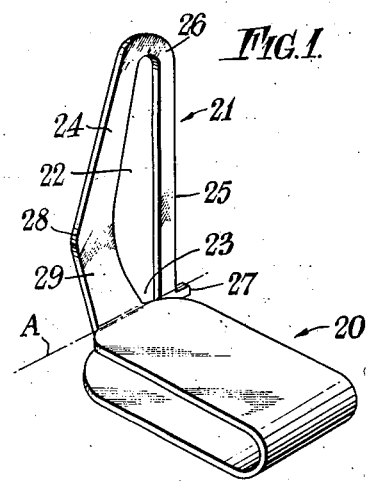
Figure 1 is a perspective view of one form of fastener.
Figure 2:
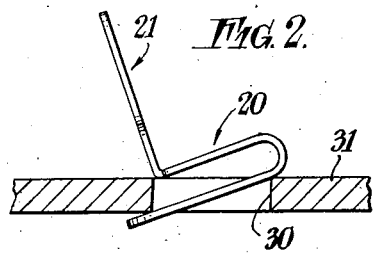
Figure 2 shows how the fastener can be engaged in an aperture in a trim pad.
Figure 3:
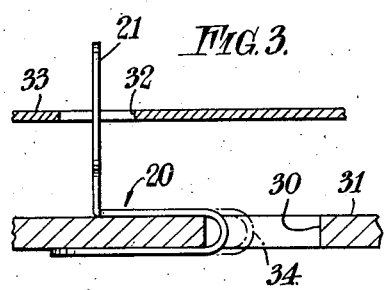
Figure 4:
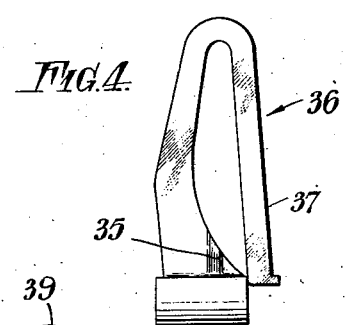
Figure 5:
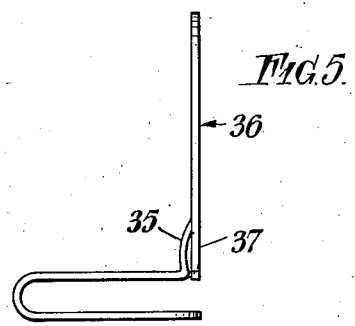
Figure 6:
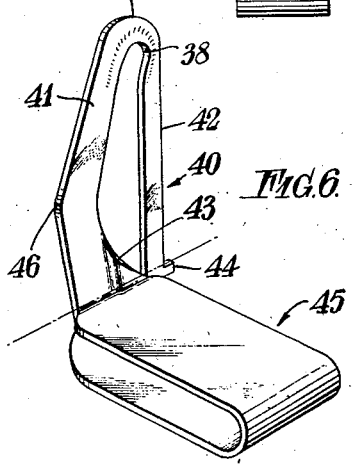
Figure 7:
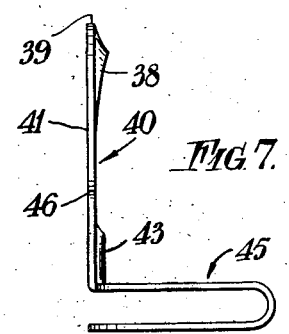

Figure 3 shows the fastener of Figures 1 and 2 fully home in a trim pad and about to be snapped into engagement with an aperture in a metal panel, Figures 4 and 5 are a front and side elevation respectively of another fastener, and Figures 6 and 7 are a perspective and side view of another fastener.

Referring first to Figures 1 and 3, the fastener here illustrated is formed from a single strip of metal which is bent at the point A, along a transverse line, into two portions standing approximately perpendicular one to the other. The longer portion is bent into a U-shaped hook 20 and the shorter portion is formed into a U-shaped snap-engaging stud 21. The stud is formed by cutting out of its central portion a slot 22 which opens out of the side of the strip at 23 where the stud and hook join each other. The stud thus constitutes two limbs 24 and 25, and a nose 26. The free limb 25 is formed with an outwardly directed foot 27, whilst the limb 24 is formed with an elbow 28 and with a wider root portion 29 giving it added strength in the neighbourhood of the bend A.

In use several of such fasteners are engaged by their hook 20 in holes 30 (Figures 2 and 3) formed in a trim pad 31 (near its edges) at spaced intervals corresponding with the spacings of holes 32 (Figure 3) formed in a steel panel 33 constituting a door of an automobile. The fasteners are secured in this way so that the studs project from the trim pad on the reverse side of the trim material and if desired the lower limbs of the channel-shaped hooks may be covered by the trim material.

The trim pad 31 is then brought up to the panel 33 and the studs pushed through the holes in the panel, as illustrated in Figure 3, so that each fastener snaps into engagement with a hole to hold the trim pad securely to the panel, the foot 27 preventing the stud from being inadvertently pushed too far through the hole 32 in the panel.

Figure 2 illustrates how the hooks of the fasteners are secured in the trim pad holes, the hooks being inserted mouth first into the holes and then being tilted to make the hook engage an edge of the hole.

Since there are a plurality of such fasteners arranged at spaced intervals around the peripheral edge of the trim pad, any shrinkage of the pad is accommodated by virtue of the fact that the hooks such as 20 move out a little, with respect to the trim pad, into the position shown in dotted lines at 34 in Figure 3.

The lower limb of the hook is carried across the open mouth of the stud in order that, when the stud is snapped into its hole, the lower limb may provide a good bearing surface.

Figures 4 and 5 illustrate another fastener similar to that of Figures 1 to 3 except that a portion 35 of the metal at the root of the stud 36 is pushed out of the general plane of the root in order to allow the foot of the free limb 37 of the stud movement sufficiently far to overlap the root portion 35.

Figures 6 and 7 illustrate a third fastener in which greater resilience has been given to the snap-engaging stud. It will be noticed that in the two previous fasteners the whole of the stud, except the root portion 35, lies in the same flat plane, with the result that, in certain cases, it is difficult to give the stud sufficient resilience.

In the fastener of Figures 6 and 7 this difficulty is overcome by bending a portion 38 at the inner edge portion of the nose 39 of the stud 40, out of the general plane of the stud. This bending is effected around the inside of the nose and down the two limbs 41 and 42 of the stud (see Figure 7), and the further down the limbs the bending is carried the greater is the resilience given to the stud. This fastener is formed with a recess 43, similar to the recess 35 of Figures 4 and 5, with an outwardly turned foot 44 which can be moved into the recess 43, with a hook portion 45, and an elbow 46 on the limb 41.

The fasteners of Figures 4 to 7 are used in the same way as that described with reference to Figures 1 to 3.

What I claim is:

1. A fastener comprising a single strip of resilient metal bent at a position intermediate its length, and about a line lying approximately parallel with its surface, into two portions disposed approximately perpendicular to one another, the one portion being bent about a transverse line, lying approximately parallel with its surface, into a U-shaped hook, and the other portion being formed with a longitudinal slot opening out of the strip in the neighbourhood of the junction of the two portions so as to form a U-shaped stud the two limbs of which lie in approximately the same edgewise plane, at least one limb of the stud being formed with a snap-engaging elbow.

2. A fastener as claimed in claim 1, wherein the free end of the free limb of the U-shaped stud is formed with an outwardly directed foot.

3. A fastener as claimed in claim 1, wherein a portion of the root of the fixed limb of the U-shaped stud is displaced out of the general plane of this limb to form a recess accommodating the free end of the free limb when the stud is pinched.

4. A fastener as claimed in claim 1, wherein the nose of the U-shaped stud is bent, over a portion of its width, out of the general plane of the nose to give the stud added resilience.

5. A fastener comprising a single flat strip of spring metal in the form of a U-shaped body, an arm integral with one leg of said body at the open end of the U and extending at approximately right angles therefrom, the juncture between said arm and said leg extending the major portion of the width of the leg, the inner edge of the arm portion adjacent the juncture inclining gradually outwardly toward the outer edge of the arm for a portion of the length thereof, the remaining portion of the arm inclining in an opposite direction and gradually decreasing in width, the juncture of said arm portions forming at the outer edge a snap-engaging elbow, said arm termniating in a second arm extending in the opposite direction toward the body with the free end thereof disposed at the body.

6. A fastener comprising a single flat strip of spring metal in the form of a U-shaped body, an arm integral with one leg of said body at the open end of the U and extending at approximately right angles there from, the juncture between said arm and said leg extending the major portion of the width of the leg, the inner edge of the arm portion adjacent the juncture inclining gradually outwardly toward the outer edge of the arm for a portion of the length thereof, the remaining portion of the arm inclining in an opposite direction and graduallly decreasing in width, the juncture of said arm portions forming at the outer edge a snap-engaging elbow, said arm terminating in a second arm extending in the opposite direction toward the body with the free end thereof disposed at the body, and an outwardly extending foot on the free end of said second arm.

References Cited in the file of this patent

UNITED STATES PATENTS

| | | |
|---|---|---|
| 1,982,232 | Place | Nov. 27, 1934 |
| 2,152,603 | Pender | Mar. 28, 1939 |
| 2,194,855 | Jones | Mar. 26, 1940 |
| 2,264,957 | Shafarman | Dec. 2, 1941 |
| 2,275,553 | Place | Mar. 10, 1942 |